United States Patent [19]

Harrison

[11] 4,110,499
[45] Aug. 29, 1978

[54] FIRED CLAY PILLOWS AND STRUCTURES MADE THEREWITH

[75] Inventor: George C. Harrison, Roseville, Minn.

[73] Assignee: Minnesota Mining and Manufacturing Company, Saint Paul, Minn.

[21] Appl. No.: 761,265

[22] Filed: Jan. 21, 1977

Related U.S. Application Data

[63] Continuation of Ser. No. 649,546, Jan. 15, 1976, abandoned, which is a continuation-in-part of Ser. No. 546,708, Feb. 3, 1975, abandoned.

[51] Int. Cl.² ............................ B32B 1/08; B32B 5/16
[52] U.S. Cl. ........................................ 428/35; 264/109; 264/209; 428/220; 428/174; 428/332; 428/357; 428/402; 428/403; 428/325
[58] Field of Search ................. 428/35, 174, 332, 357, 428/403, 402, 220, 325; 264/56, 60, 66, 67, 109, 209; 106/71, 72, 97, 98; 52/325, 416, 445

[56] References Cited

U.S. PATENT DOCUMENTS

| 1,956,607 | 5/1934 | Wyatt | 264/41 |
| 2,599,268 | 6/1952 | Maculan | 264/67 |
| 2,922,719 | 1/1960 | Robinson | 106/71 |
| 3,509,010 | 4/1970 | Metzger | 428/213 |
| 3,864,443 | 2/1975 | Hopkins | 428/398 |

Primary Examiner—George F. Lesmes
Assistant Examiner—P. Thibodeau
Attorney, Agent, or Firm—Cruzan Alexander; D. M. Sell; D. P. Edmundson

[57] ABSTRACT

Unique fired clay pillows are described which are useful for a variety of purposes. They have particular utility in structural applications when they are first rendered impervious, mixed with a hardenable binder, and then cast into a mold or form of desired size and configuration where the binder is hardened, thereby producing a consolidated pillow structure having a high degree of void space. The consolidated pillow structure is fire-resistant, weather-resistant, rot-proof, and exhibits good sound absorption and thermal insulation properties.

39 Claims, 10 Drawing Figures

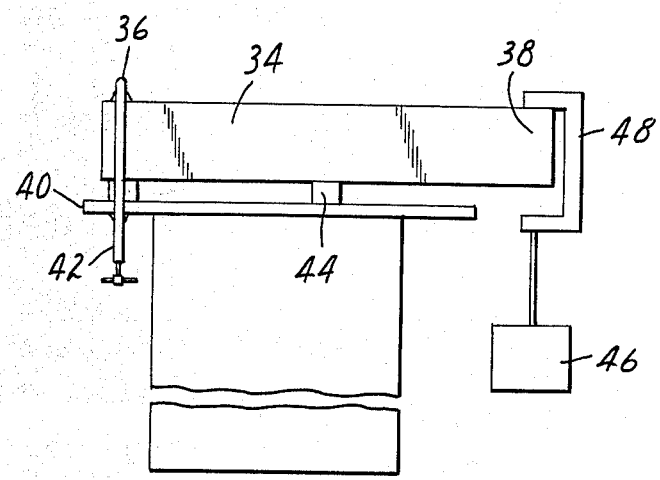
FIG. 7
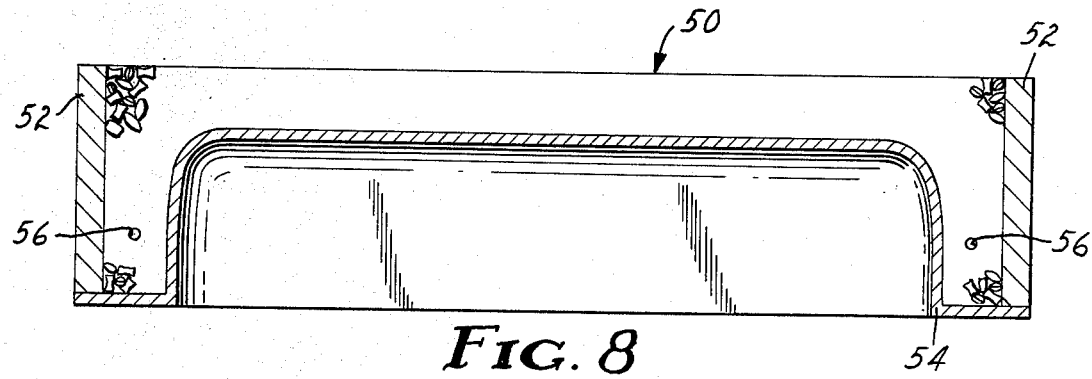
FIG. 8
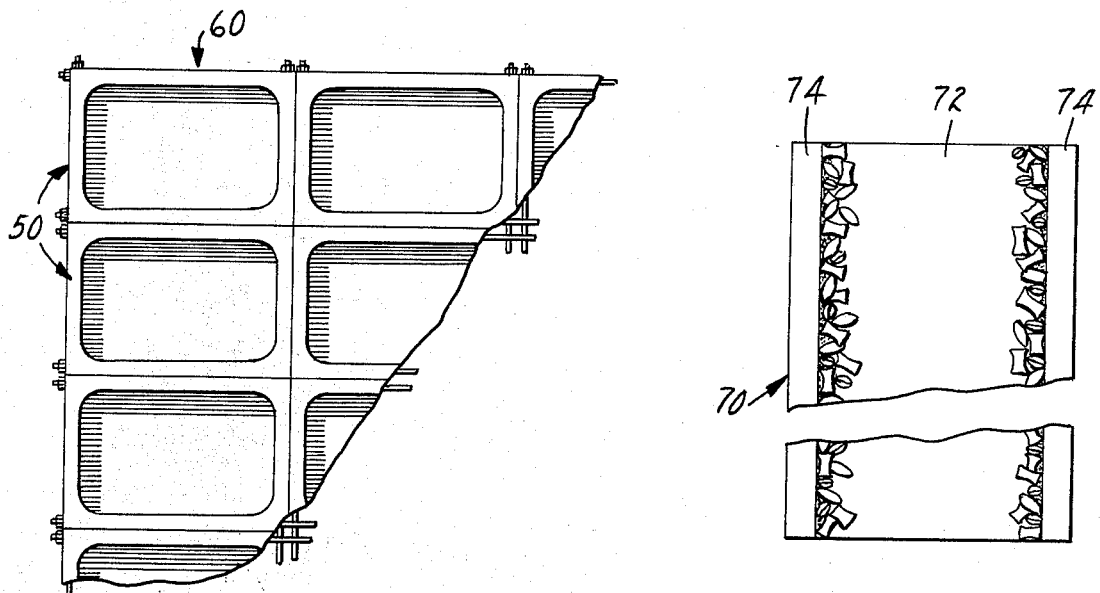
FIG. 9
FIG. 10

0
FIRED CLAY PILLOWS AND STRUCTURES MADE THEREWITH

CROSS-REFERENCE

This application is a continuation of copending application Ser. No. 649,546, filed Jan. 15, 1976, now abandoned which is a continuation-in-part of application Ser. No. 546,708, filed Feb. 3, 1975, now abandoned.

BACKGROUND OF THE INVENTION

This invention relates to articles made of clay and, more particularly, to fired clay articles. In another aspect this invention relates to consolidated structural articles.

Since clay can be made plastic by addition of water, easily worked into various shapes by hand, and then fired to a rigid and water-insoluble state, clay has accordingly been used for centuries by even the most primitive civilizations to make pottery, building blocks (e.g., bricks), jewelry, tools, etc. Because clay is so easily worked and because it is a very common material — it being found in virtually every country and locality — its use has been extremely wide-spread. In fact, in some countries clay is virtually the only material available which can be used economically to make houses and other building structures. Because of this widespread and extensive use of clay, the art of making it plastic with water, shaping it into a desired article, and then drying and firing the article has become highly developed and well-known throughout the world.

In one aspect the present invention provides unique articles in the form of small hollow pillows which can be easily formed from conventional clay and then fired. The pillows can be readily and economically bound together in any desired configuration to form rigid but light-weight consolidated structures or articles useful, for example, in the construction of buildings. The consolidated pillow structure has a high degree of void space between pillows, is self-supporting and load bearing, is easily worked with common tools, may be reinforced in conventional manners, and has a low coefficient of thermal expansion and contraction. It also has other very desirable properties including fire-resistance, vermin-resistance, weather-resistance (i.e., it does not deteriorate under the effects of freeze-thaw cycling, sunlight exposure, is practically water-insensitive), good sound absorption, ventilation and thermal insulation properties. The consolidated structures may be easily and conveniently made to any desired size and shape at the time of use without any waste of material.

Consequently, the consolidated structures of the invention are a marked improvement over conventional clay, ceramic and concrete building materials such as bricks, blocks and building tile which are heavier, non-insulative, must be bonded together with mortar, difficult to cut to desired size and shape, requires skilled labor for assembly, are expensive to transport, and cannot practicably be preassembled off the job site.

Since any conventional clay may be used in the practice of this invention, and since clay is a plentiful natural resource in all countries, the present invention provides a simple and economical solution to the construction industry in countries which are beset with lack of conventional building materials or financial ability to procure such materials.

Although others have made consolidated structures using particles of various shapes and designs bonded together, such prior art structures have inherent disadvantages of one type or another and have not been found useful in the areas of application where the present invention provides unique advantages. For example, rocks or stones of various shapes and sizes have previously been bonded together with resinous binders (e.g., Hensley, U.S. Pat. No. 3,687,021) or with asphaltic binders (e.g., Richards, U.S. Pat. No. 3,439,450). However, the disadvantages inherent in those structures include high bulk density (e.g., about 100 pounds per cubic foot, or more), low insulative properties, only a low to moderate degree of void space, have very limited self-supporting characteristics, and are virtually unworkable with common tools. Furthermore, the amount of binder which must be used in consolidated rock structures is substantial because of the numerous large contact areas between rock surfaces.

Other consolidated structures made of wood, plastic, and the like typically are not suitable or desirable as structural elements nor can they be conveniently made to the desired size and configuration. In any event, such structures do not offer the myriad of unique advantages and practical features provided by the present invention.

DETAILED DESCRIPTION OF THE INVENTION

The present invention is described in more detail hereinafter with reference to the accompanying drawings wherein like reference characters refer to the same parts throughout the several views and in which:

FIG. 7 shows apparatus used to measure beam strength of a consolidated pillow structure;

FIG. 8 is a cross-sectional view of a mold containing pillows bonded together to form a shaped structural article;

FIG. 9 shows a plurality of the articles of FIG. 8 connected together to form a supporting structure; and FIG. 10 is an end view of a consolidated structure of pillows, in the form of a panel, having reinforcing sheets bonded to both faces thereof.

Figure 1:
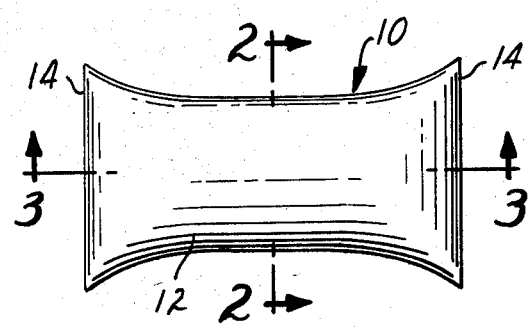
FIG. 1 is a top view of a fired clay pillow of the invention.
Figure 2:
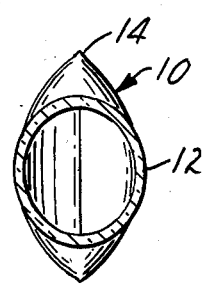
FIG. 2 is a cross-sectional view of the pillow of FIG. 1 taken along lines 2—2.
Figure 3:
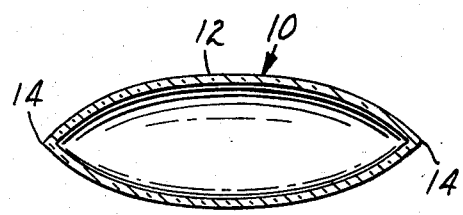
FIG. 3 is a cross-sectional view of the pillow of FIG. 1 taken along lines 3—3.

In FIGS. 1–3 there is shown fired clay pillow 10 having a tubularly-shaped body section 12 whose ends 14 are flattened closed. The pillow is rigid and the wall thickness is uniform. The body section at its mid-point (shown in FIG. 2) is round or substantially round in nature and may be slightly elliptical.

It has been found that these pillows have particular utility in structural and load bearing applications when they are bonded together with a binder to form a consolidated structure. The "pillow" shape is unique for this purpose because the flattened and flared ends 14 thereof prevent high density packing of pillows and assures that a high percentage of void spaces will be present between pillows in the consolidated structure.

Typically, the void space is about 40 to 45% between pillows whereas the amount of void space obtainable in a consolidated structure of spherical particles is at most about 30% and is even less in consolidated structures of other particles (e.g., cylinders, cubes, etc.). Consequently, the consolidated structure made with pillows in accordance with this invention is extremely light-weight and the amount of binder necessary to bond the pillows together at their contact points is much less than is required with other particle shapes. The high degree of void space also contributes significantly to the thermal insulation and sound absorption qualities of the consolidated structures. Of course, the void space inside of the pillows is also very important. In addition to contributing to the light-weight of the pillow, the internal void space also reduces the thermal conductivity of the pillow and increases the thermal insulation properties thereof.

For pillows used in the making of consolidated structures it has been found that the outside diameter of the body section should be about 3 to 10 millimeters (preferably 5mm.) at its mid-point and that the shell wall should have a thickness of about 0.2 to 1 millimeter (preferably 0.4 to 1 mm.) in order to obtain the optimum balance of light-weight and desired strength in the consolidated structure. For the purposes of this invention, the term "outside diameter" refers to the largest dimension across the body section of the pillow at its midpoint (i.e., at the point where cross-section 2—2 is shown in the drawings).

When the shell wall is thinner than about 0.2 mm. the pillow is more fragile than desired and is accordingly more susceptible to breakage during processing. Also, the strength obtainable in a consolidated structure of pillows with thin walls is usually less than desirable, although for some applications (e.g., energy absorbing devices) this lower crushing strength has been found beneficial. When these structures are sharply impacted the force or energy is absorbed without rebound because the individual pillows are crushed inwardly.

When the shell wall thickness is greater than about 1 mm. the pillows are unnecessarily heavy and a consolidated structure thereof does not exhibit markedly more strength than structures made with pillows having walls or shells within the stated range. In fact, consolidated structures of pillows having very thick walls do not exhibit desired resilience in beam form when heavily loaded. Another disadvantage is that pillows having very thick walls are not easily formed (i.e., the ends thereof are not easily flattened closed).

Furthermore, in order to obtain the most perferred balance of light-weight, strength, and minimum amount of binder necessary when making a consolidated structure of pillows, the length of the individual pillows should be about 2.5 to 4 times as great as the outside diameter of the pillow at its mid-point. When the pillows are made shorter than this the body section of the pillow becomes slightly flattened when the ends are closed. Consequently, such pillows exhibit much less strength than pillows having a length of about 2.5 to 4 times the outside diameter. When the pillows are made longer than this they do not pack uniformly in a consolidated structure; consequently, much more bonding resin is required in order to obtain a consolidated structure of desired strength. Typically the pillows have a length of about 10 to 35 millimeters, with 15 millimeters being preferred.

For the purposes of this application the term "clay" includes naturally occurring earthy minerals (both crystalline and amorphous) comprising hydrous silicates of aluminum, iron, and magnesium in the form of fine particles (often colloidal) which are plastic when mixed with sufficient water (i.e., may be deformed under stress without rupturing and will retain the shape produced after removal of the stress) but are rigid when dry. These minerals may also be mixed with various fillers (e.g., pigments), chemicals, and modifying agents (i.e., iron oxide or borax to lower the necessary firing temperature) so long as the resulting material can be made plastic with water, shaped into a desired configuration, and then dried without breaking.

Common preferred clays include kaolins, ball clays, montmorillonites, and mixtues thereof. These clays are widely found and are well-known. Common fillers which may be mixed with the clays include materials in the form of fine particles (predominantly less than about 2 microns) such as sand, talc, shale, organic matter, other minerals; etc. The amount of filler which can be used can vary widely depending upon the type of filler used and the desired physical properties in the final clay article. Generally speaking, the amount of filler included (if used at all) is about 20–30% by weight (when using sand), although amounts up to about 80% by weight (e.g., shale, calcined shale, calcined clay) have been used successfully.

Figure 4:
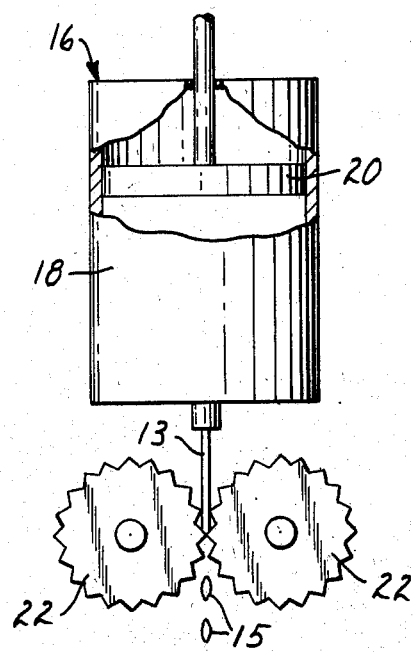
FIG. 4 shows one manner in which the pillows can be readily made.

In FIG. 4 there is shown one manner in which the pillows of the invention can be readily made using extruder 16 comprising cylindrical housing 18 and piston 20. Clay which has been made plastic with water is forced out of cylinder 18 through a die assembly so as to form a hollow tube of clay 13. The amount of water necessary to make the clay plastic may vary, depending upon the clay selected, but the amount is usually between 18% and 35% by weight.

Serrated wheels 22, driven at the same rate of speed, pinch or compress the tube together at regular intervals so as to form individual pillows 15 having flattened and closed ends. To prevent collapse of the pillow during its formation it is desirable to maintain air or gas pressure inside of the tube at or slightly exceeding atmospheric pressure.

Figure 5:
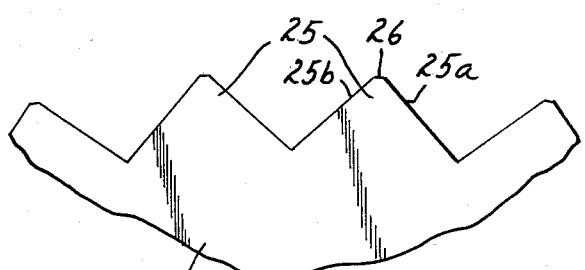
FIG. 5 is an exploded view of a portion of one of the cutting wheels used in the apparatus of FIG. 4.

In FIG. 5 there is shown an exploded view of one of the serrated wheels 22 having teeth 25 around its periphery. The faces of the teeth 25a and 25b are preferably at right angles to each other or substantially so. The tip 26 of each tooth is in the form of a flat plateau typically about 0.002 – 0.04 inch (0.05 – 1 mm.) wide.

When the faces of the teeth form an oblique angle (i.e., greater than 90°) the serrated wheels tend to unduly flatten the body section of the pillows and this is undesirable. When the faces of the teeth form an acute angle (i.e., less than 90°) the serrated wheels, when moving at a practical speed, tend to cut through the tube of clay and thus form pillows which are thin-walled or open at their ends instead of being closed.

The purpose of the plateau on the tip 26 is so that corresponding teeth on the opposing serrated wheels will still produce the proper shape at the ends of the pillows even if the teeth are not precisely aligned.

Pillows 15 (formed by the apparatus of FIG. 4) are air dried to remove essentially all of the water. The pillows are then fired at the desired temperature in any suitable atmosphere (e.g., air or inert gas) to form pillows of the type shown in FIGS. 1–3. Depending upon the particular clay used, there may be about 8–30% by volume shrinkage during firing.

Generally speaking, the strength of the pillow increases with higher firing temperatures. To obtain pillows having maximum strength it is desired to fire them at a high temperature but below that at which the clay pillows fuse together (preferably about 100° F. below this fusing temperature). For most common clays this means that the pillows should be fired at a temperature generally in the range of about 2000° F. to 2500° F., although certain clays (e.g., refined clays) may be fired at higher temperatures but still below their fusing temperature. Of course, the requisite firing temperature may be lowered by including in the clay, as a filler, a material such as iron oxide or borax. The reasons for firing the pillows at a temperature below their fusing temperature is two-fold. Since the pillows are commonly fired in a batch process, they would become undesirably fused or bonded together if fired at or above their fusing temperature. Furthermore, when the clay fuses or melts it becomes smooth and impervious. Consequently, use of common resin binders on such pillows results in bonds which are water sensitive. Of course, if it is not necessary to bond the pillows together with common resin binders, then it may be desirable, or preferred, to fire the pillows at a sufficiently high temperature that they become impervious.

For some purposes, however, it is not desired to fire the clay pillows at temperatures over 2000° F. For example, when it is desired to obtain clay pillows which are very water-absorptive or very fragile (i.e., easily crushed), the pillows an be fired at temperatures lower than 2000° F. and usually in the range of about 1000° to 1300° F.

Although the pillows are useful for many purposes while unmodified after firing, they have major utility when fired at high temperatures and then bonded together to form a consolidated structure. For this purpose it is first necessary to render the external surface of the fired pillow impervious to water, solvent, liquid resins, and the like. This is accomplished by providing the pillows with a thin, non-tacky sealing coat typically derived from a curable resin composition such as polyurethane (preferred) or any other suitable resin having similar physical properties, e.g., amine-cured epoxy resin. This sealing coat prevents the individual pillows from soaking up (and thereby wasting) the binder composition which is used later to join the pillows together in the form of a consolidated structure. The sealing coat also serves as an anchor to which the binder composition adheres tightly. The amount of material normally used as a sealing coat is that which is sufficient to seal the external surface of the pillow. When using thixotropic polyurethane compositions it has been found that amounts of about 0.5 – 2% by weight is adequate. For some other resin compositions amounts of 2 – 4% by weight or more have been found necessary.

Figure 6:
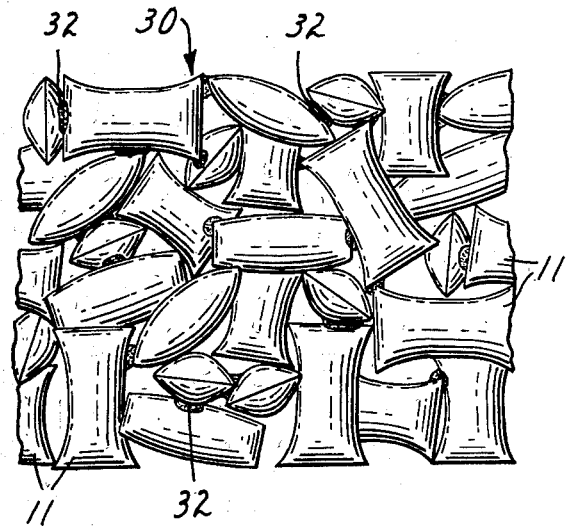
FIG. 6 shows an article comprising a plurality of pillows bonded together at their points of contact to form a consolidated structure.

In FIG. 6 there is shown an article 30 comprising a plurality of sealed pillows 11 bonded together at their points of contact by means of binder 32 to form a consolidated structure which is light-weight and has a high degree of void space (e.g., about 40–45%) between pillows. Because the ends of the pillows are flattened and slightly flared the pillows are not densely packed together nor are the points of mutual pillow contact very large. Where the pillows do contact each other the binder 32 tends to collect in the form of a small meniscus. Consequently, the amount of binder necessary to bond the pillows tightly together in this structure is relatively small compared to the volume of the structure itself, and the amount of binder necessary in considerably less than that required to bond together other particle shapes such as spheres, cylinders, cubes, etc. On the other hand, the consolidated pillow structure also has considerable strength because of the inherent ability of the pillow shape to support loads irrespective of direction applied thereto.

The consolidated structure may be made in any desired configuration, e.g., in the shape of bricks, building blocks, boards, beams, etc.

The consolidated structure of pillows is weather-resistant, rot-proof, fire-resistant, vermin-proof, is not broken apart by repeated freeze-thaw cycling, and also exhibits good sound absorption and thermal insulation properties. It is also rigid and may be easily worked (i.e., cut, chiselled, drilled, abraded, etc.).

The structure may also be reinforced by means of conventional techniques (i.e., metal rods, bars, beams, etc.). This is normally accomplished by placing the desired reinforcing means into the mold before pouring in the pillows and binder so that the reinforcing means extends through the interior of the structure. The structure may also be reinforced by the conventional technique of adhering to one or more surfaces thereof materials known to have structural strength such as plywood, metal sheet, reinforced plastic, etc. For the foregoing reasons this consolidated structure is ideally suited for use in building and other structural applications.

The structure can also be easily bonded to another like article or to wood, metal, etc. by means of adhesive. The external surfaces of the consolidated structure may be decoratively finished, if desired, by plaster (i.e., conventional plaster compositions or cement-containing compositions commonly referred to as stucco) etc., or it may be covered with decorative film or other sheet material.

The consolidated structural article 30 is easily formed by first mixing the sealed pillows with an appropriate amount of a binder, arranging the pillows into the desired configuration, and then permitting the binder to harden so that the pillows are bonded together at their points of contact. For consolidated articles to be used in structural applications it is normally desirable for the binder to cure or otherwise harden to a rigid, water-insoluble, high strength, tough, and durable state. One can increase the resiliency of such consolidated articles by using a binder which is tough yet resilient.

Various binders may be used in making consolidated articles, although curable organic resins are normally preferred. Typical of resins which are useful as rigid binders are phenolics, amine-cured epoxy resins, urea-formaldehyde resins, and polyester resins. Typical of resins which may be formulated with any desired degree of rigidity or resiliency include polyurethanes and acid-cured epoxy resins. An example of a binder which is water-sensitive is polyvinyl acetate, which may be desirable for some purposes.

The amount of binder material normally used to bond the pillows together is dependent upon the amount of strength desired in the consolidated structure. The amount of binder used to obtain a high strength bonded structure is about 1 to 8% based on the weight of the pillows, depending upon the cohesive and adhesive strength of the binder resin selected. Although one may use more than this amount of resin, there is no practical reason to do so.

In FIG. 7 there is shown suitable apparatus which may be used to test the beam strength or deflection of consolidated structures in beam form. The structure 34 to be tested (2 inches × 4 inches × 24 inches) is anchored at one end 36 to table 40 by means of clamp 42. A fulcrum 44, measuring 1⅝ inches wide by 2 inches long, is positioned mid-way along beam 34. The free end 38 of the beam is loaded by means of weight 46 suspended from stirrup 48. The deflection or sagging of end 38 of the beam is then measured at various intervals of time.

In FIG. 8 there is shown a mold assembly 50 comprising edge supports 52 and pan-shaped insert 54. Steel rods 56 extend through the mold. Pillows which have been mixed with a suitable binder are simply poured or cast into thd mold to form the shape thereof. The binder is then hardened, the steel rods are removed, and the resulting consolidated structure having a pan-shaped cavity therein is removed from the mold. Several structures of this type can then be fastened together by means of steel rods to form a supporting or load bearing structure 60 as shown in FIG. 9.

In FIG. 10 there is shown a reinforced structure 70 comprising a center portion or core 72 of consolidated pillows. To each face of core 72 is bonded suitable sheets of structural material 74 such as plywood, metal, and reinforced plastic. These sheets are adhered or bonded to the consolidated pillow section by means of conventional adhesive. Reinforced structures of this type have utility in various applications, such as door panels, wall panels, office dividers, and the like.

There has, thus, been described a clay pillow construction that is particularly advantageous in forming consolidated structural articles, and some specific ranges of sizes have been set forth for the pillows when used for such purpose. However, it should be understood that the pillows of the present invention may be utilized for a wide variety of other purposes and that the pillows may be made larger or smaller than the sizes listed so long as their length is maintained at approximately 2.5 to 4 times as great as the outside diameter of their body sections. Also, the wall thickness of such pillows may be as great as 3 millimeters.

The invention is further described in the following illustrative and non-limiting examples wherein the term "parts" refers to parts by weight unless otherwise indicated.

EXAMPLE 1

A sample of yellow clayey soil (representing undisturbed sub-soil) weighing ten pounds and containing sand and small pebbles was crumbled and dropped into 3.5 gallons of water which was vigorously agitated. The agitation was stopped after all of the soil sample was added, and the pebbles and sand settled to the bottom of the container while most of the clay remained in suspension. After about 2 minutes the clay-in-water suspension was decanted and filtered through a 100 mesh screen (having openings of 0.25 millimeters) to separate a few large floating organic particles from the clay suspension. The sand and pebble residue which had settled out of the clay suspension prior to filtering was then mixed with water (one gallon) under vigorous agitation, permitted to stand for about 2 minutes, followed by decanting and filtering of the clay-in-water suspension as described above. This process was repeated a second time and all of the separate clay suspensions were added together.

While vigorously agitating the clay-in-water suspension there were added 30 drops (about 0.5 milliliters) of a 5% aqueous solution of polyacrylic acid and agitation was continued for five minutes. The clay then agglomerated and settled rapidly. The water was decanted off and the clay was placed on a paper filter and allowed to dry at room temperature. The clay was then crumbled and dried further at 110° C. for 1 hour, after which it was ground to a fine powder. This clay was comprised essentially of hydrous silicates of aluminum and iron with traces of water-insoluble magnesium compounds.

The dry clay powder was then mixed with successive increments of water until it was sufficiently plastic to be readily extrudable in the apparatus shown in FIG. 4. For the clay of this example it was found that 28 parts by weight of water for each 100 parts by weight clay was sufficient to permit extrusion thereof at moderate pressure through a die assembly to form a hollow tube having an inside diameter of 0.15 inch (3.8 millimeters) and an outside diameter of 0.20 inch (5 millimeters). Several such tubes were so extruded in lengths of about 3–4 feet (about one meter). These tubes were then laid on a flat surface and cut into "pillows" approximately ½ inch long (about 1.3 centimeters) by pressing or pinching the tube together at about ½ inch intervals with the rounded edge of a metal bar (0.76 millimeter thick). The ends of the resulting pillows were flattened and closed so as to leave a hollow cavity inside the pillow shell.

These pillows were then weighed, air dried, and then oven dried at 110° C. for 5–10 minutes. The pillows were again weighed and the weight loss was found to be 25%.

The dried pillows were then fired in a small electric kiln equipped with thermocouple and galvanometer reading temperature directly in the kiln. The pillows were fired at 2000° F. (1100° C.) for 2 hours, after which the kiln was shut off and permitted to cool overnight with the pillows inside.

The resulting pillows were found to have shrunk 16% by volume during the firing process. The outside diameter of the pillow (at its mid-point) was about 4.3 mm., the uniform shell wall thickness was about 1 mm., and the length of the fired pillows was about 3 times as great as the outside diameter. The pillows had the shape shown in FIGS. 1–3 and each individual pillow weighed about 0.16 gram. The bulk density of the pillows was about 40 pounds per cubic foot (650 grams per liter). The brown buff colored pillows were quite hard and exhibited considerable structural strength. The pillows were also rather porous, absorbing about 10% of their weight of water when immersed.

EXAMPLE 2

The fired clay pillows of Example 1 were coated on their external surface to render such surface impervious to water, air, organic solvents, liquid resins, etc. using the following process. A quantity of pillows weighing 2439 grams were charged into a 5 gallon rotating mixer having a stationary mixing blade, after which 24.4 grams of a two-part curable polyurethane resin composition was added. Part A of the resin composition comprised:

| Ingredient | Parts by Weight |
| --- | --- |
| Polypropylene triol (M.W. 440) | 48.07 |

-continued

| Ingredient | Parts by Weight |
|---|---|
| Polypropylene triol (M.W. 740) | 50.90 |
| Hexamethylene diamine (thixotropic agent | 0.71 |
| Calcium octoate | 0.238 |
| Dibutyltindilaurate (catalyst) | 0.091 |

Part B comprised 85 parts of polymethylpolyphenyl isocyanate (commercially available under the tradename "Mondur MRS"). Part A was mixed rapidly with Part B for 30 seconds before being added to the rotating mixer containing the pillows. This resin composition is very thixotropic and has the consistency of whipped cream. The resin composition is mixed with the pillows until they are uniformly coated (about three minutes) after which the mixing is discontinued and the coating is permitted to cure, either at room temperature or at elevated temperatures. After the coating has cured the pillows may be slightly bonded or stuck together but they are readily separated again into free flowing form by stirring or with hand crushing. The resulting pillows have a sealed external surface which is impervious to air, water, solvents, liquid resins and the like.

If desired, the resin composition used to coat the external surface of the pillows may additionally contain various fillers, pigments, alternate viscosity modifiers (e.g., phenylene diamine), etc. One specific example of a suitable particulate filler is fine sand or silica which becomes bonded to the surface of the pillows and forms a coating to which concrete bonds readily.

EXAMPLE 3

The sealed pillows of Example 2 are bonded together in the form of a consolidated mass which is useful as a structural material using the following process. All of the sealed pillows from Example 2 were added to the rotating mixer and 75 grams (about 3% of the weight of the pillows) of a two-part polyurethane resin composition was added thereto. Part A of the resin composition comprised:

| Ingredient | Parts by Weight |
|---|---|
| Polypropylene triol (M.W. 440) | 48.07 |
| Polypropylene triol (M.W. 740) | 50.90 |
| Calcium octoate | 0.238 |
| Dibutyltindilaurate | 0.091 |

Part B comprised 85 parts of polymethylpolyphenyl isocyanate. Part A was thoroughly mixed with Part B and then added to the rotating mixer containing the pillows and mixed therewith for 2 minutes. The pillows were then poured into a mold measuring 12 inches × 12 inches × 1.5 inches (30.48 cm. × 30.48 cm. × 3.81 cm.) and the resin was allowed to cure at room temperature for about 1 hour. Where the pillows contacted each other a double meniscus fillet of resin formed. This cured resin was very hard and tough and was insoluble in water and common organic solvents.

The resin bonded extremely firmly to the surface of the pillows at these fillets and the bonded structure was very rigid and durable. The void space in the structure was over 40% and the density of the structure was about 43 pounds per cubic foot (700 grams per liter). Although the structure is permeable to air and water (because of the high percentage of void space between the pillows), it is an excellent thermal insulator when the sides of the structure are covered to restrict air movement therethrough. The insulation value has been determined to be 1.09 Btu/square foot/inch/hour/degree F. as measured by ASTM C-177.

The bonded structure is also unaffected by repeated freezing and thawing after being immersed in water. Further, this structure is vermin-proof and fire-resistant.

EXAMPLE 4

Using the procedures of Examples 1-3 clay pillows were formed, sealed, and coated with bonding resin. They were then cast into suitable cylindrically-shaped molds before curing of the bonding resin. One of the molds was 3.875 inches (9.84 cm.) in diameter and 1.5 inches (3.81 cm.) high while the other mold was 1.125 inches (2.86 cm.) in diameter and 1.5 inches (3.81 cm.) high.

After the resin was cured the two bonded structures were tested for sound absorption characteristics according to the procedure of ASTM C-384-58. The noise reduction coefficient approximated 20% (per one inch of sample thickness) for all frequencies from 250 to 4000 cycles per second.

EXAMPLE 5

Using the procedures of Example 1-3 clay pillows were formed, sealed, and coated with bonding resin. They were then cast into a cylindrically-shaped mold before curing of the bonding resin. The mold was 3 inches (7.62 cm.) in diameter and 3 inches (7.62 cm.) high. Several samples were made.

After curing of the bonding resin a sample of the cylindrically shaped consolidated structure is supported in a horizontal position with one end or face thereof spaced 2 inches (5.08 cm.) from a gas burner (having a flame temperature of 1800° F.). The flame from the gas burner was directed against the end of the consolidated structure. A thermometer was inserted into a drilled hole in the cylindrically shaped structure at a distance of two inches from the end or face thereof which was exposed to the flame. The bonding resin slowly decomposed and some of the pillows fell away but the consolidated structure did not burn. After ten minutes of exposure to the flame, the thermometer reading increased to only 150° F. (65° C.) from the original reading of 75° F. (24° C.).

Another sample of the cylindrically shaped consolidated structure was tested to determine its compressive strength. The sample was placed upright in a press so that the ends of the cylinder were flat against the opposing plates of the press (which had been covered with a 0.25 mm. thick rubber sheet of 60 Shore A durometer). Increasing force was applied until the consolidated structure failed. For this sample a pressure of 700 pounds per square inch (53 kg. per square centimeter) was recorded before failure.

EXAMPLE 6

Following the procedures of Examples 1-3 clay pillows were made, sealed, and mixed with a binder. Prior to curing of the binder the pillows were cast into molds of various sizes, followed by curing of the binder to form various consolidated structures.

The resulting consolidated structures could be easily cut and worked with ordinary chisels, power drills (using either common steel bits or mason bits), power saws and hand saws fitted with mason's blades, high performance sandpaper, etc. The surfaces of the consolidated structures are quite smooth where cut or otherwise worked in this manner.

As one specific example a large rectangular recess was cut into the surface of a consolidated structure so that a common electrical switch box could be mounted therein. A power drill was then used to form small holes in the consolidated structure through which electrical wiring was run to reach the electrical switch box. Another manner in which the holes for the wiring can be made is by hammering a small pipe (having a sharpened end) directly through the consolidated structure.

EXAMPLE 7

Consolidated structures of the preceding examples can be bonded to each other or to various other substrates (e.g., wood, metal, brick, foam, vinyl, ceramic tile, concrete, etc.) using the thixotropic two-part polyurethane composition described in Example 2 and further containing 20% by weight of glass bubbles (2 microns average diameter). The composition is spread as a glue over the surface to be joined and then such surfaces are pressed together and held until the composition has cured. Extremely firm bonds are obtained.

In like manner, various other adhesives or bonding agents may be used to join such structures.

EXAMPLE 8

Consolidated structures of the preceding examples can be finished on their outer surface in various manners. As one example, common wet plaster is applied to the surface with a trowel and is forced slightly into the void space in the consolidated structure. After the plaster hardens it can be sanded smooth. If desired, the plaster can be sanded off until the individual pillows in the consolidated structure begin to show through. This leaves a decorative wall panel. One can also continue sanding this surface (and the exposed pillows) until portions of the pillow walls have been sanded away to reveal the cavity in such pillows.

In another variation the plaster surface may be further coated with wet plaster using a soft paint brush to leave a stucco effect.

In still other variations, wall paper, paint, plastic sheeting, and plastic and ceramic tile can be applied to the plastered surface.

A further variation is to coat the external surface of the consolidated structure with a common mastic and, before drying thereof, further applying a layer of differently colored small fired clay particles (1.6 mm. in diameter and about 3 mm. long). The small clay particles are then rolled into the mastic so as to be partially embedded therein. After the mastic hardens the surface is water-proof and weather-resistant. Accordingly, this structure is well suited as a roofing material.

EXAMPLE 9

Following the procedures of Examples 1–3 clay pillows were made, sealed, and mixed with a binder. Prior to curing of the binder the pillows were cast into a mold measuring 2 inches × 4 inches × 24 inches (5 cm. × 10 cm. × 60 cm.) in which two steel reinforcing rods (5 mm. in diameter) were disposed. The rods were threaded at each end. The steel rods were in excess of 24 inches long and were disposed lengthwise in the mold 2.75 inches (7 cm.) apart. The top surface of the mass of pillows was trowelled smooth and the binder was allowed to cure. Then a steel plate measuring 2 inches × 4 inches × ⅛ inch (5 cm. × 10 cm. × 3.5 mm.) with appropriate holes therein to receive the ends of the steel rods was bonded to each end of the consolidated structure with the thixotropic resin composition of Example 2. After curing of the resin, nuts were threaded onto the ends of the rods and tightened against the steel plates.

The resulting reinforced structure was then disposed on one edge and placed on a fulcrum positioned midway along the length of the structure (in the manner shown in FIG. 7) in order to test the beam strength thereof. One end of the beam was fastened securely to the table and a weight of 60 pounds (27.2 kilograms) was suspended from the other end.

As a comparative example a similar size straight grained wood (Douglas fir) beam was disposed on one edge and placed on a fulcrum in the same manner with a weight of 60 pounds being suspended on one end.

After 2 weeks the weighted end of the wood beam was sagging ⅛ inch (about 3.2 mm.) while the consolidated pillow beam remained straight (i.e., no sag). After six months the weighted end of the wood beam was sagging 3/16 inch (about 4.7 mm.) while the consolidated pillow beam remained straight.

As another comparative example another consolidated structure of pillows is made as described above in this example except that no steel reinforcing rods are included therein. When tested in accordance with the above procedure using a five pound weight (2.27 kilograms) the weighted end of the beam deflected ½ inch (12.7 mm.) after 7 days. Upon removal of the weight the beam recovered to within ⅛ inch (3.2 mm.) of its original position within another 7 days.

This example shows that the consolidated structure has resiliency under load. The consolidated structure which has been reinforced with steel rod also exhibits a small but desirable degree of resiliency when heavily loaded. This phenomenon is only observed when the pillow walls are less than about 1 mm. in thickness and the pillows have been fired at temperatures above about 2000° F. (i.e., fired at a temperature slightly below their fusing point).

EXAMPLE 10

Fired clay pillows (100 grams) are made in accordance with Example 1 and are then placed in a mixer as described in Example 2, followed by addition thereto of 1% by weight of the two-part polyurethane composition also described in Example 2. After the resin composition and pillows have mixed for two minutes 100 grams of fine sand (less than 100 mesh) are added and mixing is continued for an additional two minutes. The mixing is then stopped and the resin is allowed to cure overnight.

Although the pillows were slightly agglomerated after curing of the resin, they were easily separated by hand into free flowing discrete pillows again. Microscopic examination showed that the sand was evenly distributed over, and bonded to, the surface of the sealed pillows.

These treated pillows were then used in making lightweight concrete structures. The ingredients (by volume) comprised one part portland cement, three parts sand (less than 20 mesh) and four parts treated pillows. Water was added to make a trowelable mixture which was then cast into a mold and cured.

The resulting structure weighed 35% less than concrete made using an equivalent volume of pea rock in place of pillows. The structure containing pillows also absorbed less total water during immersion than did an equal sized sample of the ordinary concrete. Further, the structure containing pillows could be cut while the ordinary concrete could not.

EXAMPLE 11

Pillows were formed as described in Example 1 except that the clay used was a commercial clay ("Old Hickory") available from Minnesota Clay Company. The individual pillows were tested for burst strength after oven drying at 225° F. (110° C.) and after being fired for 2 hours at various temperatures.

The burst strength or breaking strength was measured using an ordinary bathroom scale of the type having a top surface comprising a metal plate covered with a 0.25 millimeter thick rubber sheet (60 Shore A durometer). A pillow to be tested was laid on the rubber sheet and another metal plate (whose surface was covered with a similar rubber sheet) was laid thereover. Increasing force was applied to the fattest part of the pillow via the top metal plate (covered with the rubber sheet). The maximum force required to burst or break the pillow was then recorded.

The burst strength for the clay pillows which were simply oven dried was 1.4 pounds (0.63 kg.). The burst strength after firing the pillows at various temperatures was as follows:

| Firing Temperature | Burst Strength |
| --- | --- |
| 1000° F. (535° C.) | 1.8 pounds (0.82 kg.) |
| 1100° F. (590° C.) | 2.0 pounds (0.91 kg.) |
| 1200° F. (650° C.) | 2.4 pounds (1.1 kg.) |
| 1300° F. (705° C.) | 2.6 pounds (1.2 kg.) |
| 1400° F. (760° C.) | 3.5 pounds (1.6 kg.) |
| 1500° F. (815° C.) | 6.5 pounds (3.0 kg.) |
| 1600° F. (870° C.) | 9.5 pounds (4.3 kg.) |
| 1700° F. (925° C. | 10–12 pounds (4.5–5.5 kg.) |
| 2300° F. (1260° C.) | 42–52 pounds (19.5–24 kg.) |

Thus, with increasing firing temperature there is an observed increase in breaking strength. However, the pillows are not heated to such a temperature that they become fused or melted together. This fusing temperature below which the clays must be fired will vary with the particular clay chosen.

EXAMPLE 12

Clay pillows were formed from an extruded tube of clay using two opposing bars of aluminum which had matching teeth or notches cut into their edges. The aluminum bars were 0.5 inch (1.27 cm.) thick and the teeth were of the design shown in FIG. 5 (i.e., the two edges of each tooth formed at 90° angle and the tip of each tooth was characterized by being a flat plateau 0.002 inch wide).

The pillows formed with these opposing teeth were tightly compressed together at their ends and were of the type shown in FIGS. 1–3 (i.e., the pillow wall was uniform in thickness even at the pinched ends thereof).

EXAMPLE 13

Clay pillows were formed from an extruded tube of clay using the apparatus shown in FIG. 4. The pillow shape is obtained by passing the clay tube between the two opposing serrated wheels having teeth which are 9/16 inch (about 15 mm.) from the tip of one to the next adjacent tip on each wheel. The pillows so formed are dried, fired, and then sealed.

EXAMPLE 14

Clay pillows which had been sealed according to the procedure of Example 2 are bonded together in the form of a consolidated mass using an epoxy-containing, curable binder resin. The binder resin comprised:

| Ingredient | Parts by Weight |
| --- | --- |
| Syrupy reaction product (made by reaction 300 parts of tall oil with 100 parts of maleic anhydride at 230–240° C. for one hour | 26 |
| Liquid epoxy resin (epichlorhydrin-bisphenol A condensation polymer; commercially available from Shell Chemical Cc. as "Epon 828") | 20 |
| Dimethyl benzene (catalyst) | 0.15 |

The amount of binder resin used was 3% based on the weight of the pillows (having a bulk density of 33 pounds per cubic foot). The pillows and resin are mixed together and then cast into a mold, of the type described in Example 9 followed by heating to 125° C. for 2 hours to cure the binder. The resulting consolidated structure exhibited beam strengths similar to that exhibited by the reinforced consolidated pillow structure made in Example 9.

EXAMPLE 15

Clay pillows which had been sealed according to Example 2 are bonded together in the form of a consolidated structure using a curable epoxy resin binder comprising 100 parts of the epoxy resin of Example 14 catalyzed with 11 parts of triethylene tetraamine. The binder was mixed with the pillows in amounts of 3%, 4%, and 6% by weight of the pillows and rigid, strong consolidated structures were obtained in each case upon curing of the binder. The compression strengths of the structures were quite satisfactory.

EXAMPLE 16

Clay pillows which had been sealed according to Example 2 are bonded together to form a consolidated structure using a commonly available urea-formaldehyde resin catalyzed with one percent of a saturated aqueous solution of ammonium chloride. The binder was mixed with the pillows in amounts of 3% and 5% by weight of the pillows and curing was accomplished by heating at 105° C. for 1 hour. Rigid consolidated structures were obtained.

EXAMPLE 17

Clay pillows which have been sealed according to Example 2 are bonded together in the form of a consolidated structure using a phenolic resin as a binder resin. The phenolic resin is used in the manufacture of plywood and is made by reacting 37 parts of phenol with 56 parts of formaldehyde (37% solution) in the presence of sodium hydroxide as a catalyst. The reaction product is dehydrated at 150° F. under a vacuum of 30 mm. Hg. and a heavy syrup is obtained. This syrup, when mixed with 10% by weight water, is a very good binder resin for the pillows.

The binder resin (3.3 parts) was mixed with 100 parts by weight of pillows (bulk density of 33 pounds per cubic foot) until the pillows were uniformly wet. The pillows were then placed in a suitable mold and troweled to leave a smooth top surface.

The entire assembly was then placed in an oven at 130° C. for 1.5 hours to drive off the water and cure the binder resin. A rigid structure was obtained having high structural strength. It was noted that although some of the binder resin cured in the form of tiny islands on the surface of the pillows the preponderance of the resin collected at the contact points between pillows in the manner shown in FIG. 6.

During testing of similar consolidated structures which had been reinforced with steel rods it was observed that the structures exhibited a very high degree of beam strength. In addition to the high strength it was observed that the consolidated structures exhibited a slight degree of resiliency with full recovery.

Compression strengths of these consolidated structures (measured using the procedure described in Example 5) were found to be 700 pounds per square inch (63 kg. per square centimeter).

EXAMPLE 18

Example 17 was repeated except that the clay pillows were 25 pounds per cubic foot (400 grams per liter) bulk density and the amount of binder resin used was proportionately less than that used in Example 17. The resulting consolidated structures were found to be more compressible than the structures of Example 17.

EXAMPLE 19

A consolidated structure of pillows was adhered to a sheet of plywood 0.25 inch thick (about 6 mm.). The resulting product exhibited considerable beam strength when the plywood was in tension but not nearly as much when the plywood was in compression. This structure was also very sound absorptive on the side opposite the plywood.

When plywood was adhered to both sides of the consolidated pillow structure the product exhibited very good beam strength.

EXAMPLE 20

Clay pillows which have been sealed according to Example 2 are bonded together in the form of a consolidated structure using a polyvinyl acetate emulsion as the binder resin. An amount of emulsion equal to 3% by weight of pillows was mixed with 3% by weight water and then added to the pillows in a mechanical mixer. The mixing continued until the distribution of the binder on the pillows appeared uniform, after which the pillows were cast into a suitable mold and dried in 65° C. oven. The binder formed characteristic menisci where the pillows contacted each other and the consolidated structure was quite strong. Since the binder was water-sensitive the consolidated structure could be easily taken apart after soaking in water.

EXAMPLE 21

Hollow clay pillows which had been fired at 1100° F. (590° C.) and cooled were immersed in water for 10 minutes at room temperature and then drained. It was found that the pillows had absorbed 28.5% by weight of water.

The pillows were then immersed in water under a vacuum of 10 mm. Hg. for 10 minutes, drained and re-weighed. It was found that the pillows had absorbed 97% by weight of water.

This shows that the clay pillows, having shells which are unsealed, can be used in applications where their water absorption characteristics would be beneficial. For example, such pillows could be useful in humidification.

EXAMPLE 22

A plurality of hollow clay pillows fired at 1100° F. (590° C.) were placed in a 1000 ml. tube and air was passed therethrough at various flow rates. A comparative set-up was used which contained rock pebbles larger than 0.25 inch (about 6 mm.) but smaller than 0.5 inch (about 12 mm.) instead of clay pillows.

It was found that the air pressure drop through the clay pillows was only about one-half that of the pressure drop through the rock pebbles. Thus, the clay pillows have utility in applications such as aeration water coolers, aerobic biological reactions, mufflers, etc.

Other variants are also possible within the scope of the present invention.

What is claimed is:

1. An article comprising a fired clay pillow having a tubularly-shaped body section whose ends are flattened closed, wherein the external surface of said pillow has been rendered impervious by means of a non-tacky coating; wherein the outside diameter of said body section is in the range of about 3 to 10 millimeters and the wall thickness of said body section is about 0.2 to 1 millimeter; wherein the length of said pillow is about 2.5 to 4 times as great as said outside diameter, and wherein said flattened ends are flared outwardly so as to project beyond said body section.

2. The article of claim 1 wherein said clay has been fired at a temperature in the range of about 2000° to 2500° F.

3. The article of claim 1 wherein said outside diameter of said body section is about 5 millimeters and the length of said pillow is about 15 millimeters.

4. The article of claim 1 wherein said coating comprises a polyurethane resin.

5. The article of claim 1 wherein said coating comprises epoxy resin cured with amine catalyst.

6. The article of claim 4 wherein the amount of said polyurethane resin is in the range of about 0.5 to 2% based on the weight of said pillow.

7. The article of claim 1, wherein particulate material is adhered to said coating.

8. The article of claim 7, wherein said particulate material is sand.

9. An article comprising a plurality of fired clay pillows whose external surface has been rendered impervious by means of a non-tacky coating, said pillows being bonded together at their points of contact by means of a binder, said pillows each having a tubularly-shaped body section whose ends are flattened closed and flared outwardly so as to project beyond said body section; wherein the outside diameter of said body section is in the range of about 3 to 10 millimeters and the wall thickness of said body section is about 0.2 to 1 millimeter; and wherein the length of said pillows is about 2.5 to 4 times as great as said outside diameter; said article having at least about 40% void space.

10. An article in accordance with claim 9, wherein said binder comprises water-insoluble organic resin.

11. An article in accordance with claim 9, wherein said binder is present in an amount of about 1 to 8% by weight of said article.

12. An article in accordance with claim 9, wherein said pillows have been fired at a temperature in the range of about 2000° to 2500° F.

13. An article in accordance with claim 9, wherein the outside diameter of said body section is about 5 1 millimeters, and the length of said pillows is about 15 millimeters.

14. An article in accordance with claim 10, wherein said binder comprises a polyurethane resin.

15. An article in accordance with claim 10, wherein said binder comprises a phenolic resin.

16. An article in accordance with claim 9, further comprising reinforcement means extending therethrough.

17. An article in accordance with claim 16, wherein said reinforcement means comprises metal rod.

18. An article in accordance with claim 9, wherein at least one face thereof is adhered firmly to a substrate.

19. An article in accordance with claim 18, wherein said substrate is selected from the group consisting of wood, metal, concrete, ceramic, and plastic.

20. An article in accordance with claim 19, wherein said substrate is metal.

21. An article in accordance with claim 19, wherein said substrate is wood.

22. An article in accordance with claim 9, wherein at least one face thereof is finished with plaster.

23. An article in accordance with claim 9, wherein at least one face thereof has decorative sheeting adhered thereto.

24. An article comprising a fired clay pillow having a tubularly-shaped body section whose ends are flattened closed; wherein the outside diameter of said body section is in the range of about 3 to 10 millimeters and the wall thickness of said body section is about 0.2 to 1 millimeter; wherein the length of said pillow is about 2.5 to 4 times as great as said outside diameter, and wherein said flattened ends are flared outwardly so as to project beyond said body section.

25. The article of claim 24 wherein said clay has been fired at a temperature in the range of about 2000° to 2500° F.

26. The article of claim 24 wherein said clay has been fired at a temperature of about 1000° to 1300° F.

27. The article of claim 24 wherein said outside diameter of said body section is about 5 millimeters, and the length of said pillow is about 15 millimeters.

28. A method for making a consolidated structure comprising:
  (a) providing a plurality of fired clay pillows whose external surface has been rendered impervious by means of a non-tacky coating, said pillows each having a tubularly-shaped body section whose ends are flattened closed; wherein the outside diameter of said body section is in the range of about 3 to 10 millimeters and the wall thickness of said body section is about 0.2 to 1 millimeter; and wherein the length of said pillow is about 2.5 to 4 times as great as said outside diameter;
  (b) admixing said pillows with a binder in an amount of about 1 to 8% based on the weight of said pillows;
  (c) arranging said plurality of pillows into a desired configuration; and
  (d) hardening said binder whereby said pillows become bonded together at their points of contact.

29. The method of claim 28, wherein said clay has been fired at a temperature in the range of about 2000° to 2500° F.

30. The method of claim 28, wherein said binder comprises water-insoluble organic resin.

31. The method of claim 30, wherein said binder comprises a polyurethane resin.

32. The method of claim 30, wherein said binder comprises a phenolic resin.

33. The method of claim 30, wherein said binder comprises epoxy resin.

34. An article in accordance with claim 24, wherein said clay has been fired at a temperature sufficient to render the clay inpervious.

35. An article comprising a fired clay pillow, having a tubular-shaped body section whose ends are flattened closed; wherein the wall thickness of said body section is not greater than three millimeters; wherein the length of said pillow is about 2.5 to 4 times as great as the outside diameter of said body section, and wherein said flattened ends are flared outwardly so as to project beyond said body section.

36. The article of claim 35 wherein said clay has been fired at a temperature in the range of about 2000° to about 2500° F.

37. The article of claim 35 wherein the external surface of said pillow has been rendered impervious by means of a nontacky coating.

38. The article of claim 35 wherein the outside diameter of said body section is at least 3 to 10 times as great as the thickness of said body section.

39. An article in accordance with claim 35 wherein said clay has been fired at a temperature sufficient to render the clay impervious.

* * * * *